Feb. 1, 1966  A. M. SCHNEIDER  3,232,103
NAVIGATION SYSTEM
Filed Dec. 8, 1960
5 Sheets-Sheet 1

NOTE: ELLIPTICITY NOT SHOWN
FIG. 4

INVENTOR.
ALAN M. SCHNEIDER
BY
ATTORNEYS

Feb. 1, 1966  A. M. SCHNEIDER  3,232,103
NAVIGATION SYSTEM
Filed Dec. 8, 1960  5 Sheets-Sheet 5

*INVENTOR.*
ALAN M. SCHNEIDER
BY
*Ezekiel Wolf, Wolf + Greenfield*
ATTORNEYS

United States Patent Office

3,232,103
Patented Feb. 1, 1966

3,232,103
NAVIGATION SYSTEM
Alan M. Schneider, 14 White Pine Knoll Road,
Wayland, Mass.
Filed Dec. 8, 1960, Ser. No. 74,506
2 Claims. (Cl. 73—178)

The present invention relates to navigation systems and concerns a novel system which continuously maintains an accurate indication of the direction of a pair of axes defined relative to the navigation vehicle and a celestial body, which may be the earth. More particularly the invention combines the advantages of an acceleration sensitive system such as an inertial system and the advantages of a velocity sensitive system such as a Doppler radar system to provide continuously an accurate indication of the direction toward the center of the earth and the direction of the earth's polar axis by utilizing the known rotational velocity of the earth about its axis.

As used throughout the specification, the term "inertial space" refers to any space in which Newton's Laws of Motion are valid. For convenience in discussing navigation over the earth, inertial space will be characterized by a reference frame-J having its origin fixed at the mass center of the earth and its axes nonrotating with respect to the fixed stars. A glossary of symbols, including definitions, is provided below.

In prior art inertial navigation systems useful relationships which pertain to navigation are derived as a result of measurement by the inertial sensors (gyros and accelerometers) of such quantities as specific force and angular velocity. It then becomes necessary to distinguish between the true value of certain quantities and the inertial system's indication or measurement thereof. As a practical matter there is, in moving craft, an indicating system forming a part of the inertial navigation system which responds to the output of various inertial sensors that measure motion with respect to inertial space. In a typical inertial navigation system, there is a spatially varying reference direction called the indicated vertical that should point in the direction of the local true vertical axis. The true vertical axis is the direction towards the center of the earth. A second reference direction is the indicated polar axis which should, of course, be parallel to the earth's true polar axis, that is, the axis upon which the earth rotates. The inertial system generally tries to provide indications of these directions either explicitly or implicitly by means of the inertial sensors mentioned above together with a computer. These sensors usually consist of physical equipment such as gyroscopes, accelerometers, and the like. The computer utilizes the information indicative of the vertical and polar reference axes, a knowledge of the position of the vehicle at the start of a journey and information from the accelerometers indicative of the vector acceleration to continuously provide information on the vehicle position with respect to the earth. Vector acceleration is magnitude and direction of the rate of change of velocity of the vehicle. The directions indicated by such equipment will tend to deviate from the true direction due to errors in initial alignment and also due to errors which develop in the inertial sensors.

In a pure inertial system with no external velocity data, the indicated direction of the vertical will deviate from the true, and actually oscillate about the true in what is called the Schuler oscillation. The Schuler oscillation is the period of a pendulum suspended from the vehicle having a length from the vehicle to the mass center of the earth. The amplitude of this oscillation will continue to grow if one of the inertial sensors, such as the accelerometer, has errors which continue to feed into the system. Gyro drift can cause the polar axis indication to begin to drift off from the direction of the true polar axis. The error angle is unbounded and as time goes on it gets larger and larger in a pure inertial system. Without any other source of navigation data, an operator would not know that these errors are being generated. In equipment of this type, only the indicated axes are provided and it is not known where the true axes are. Furthermore, it is not known when an error is being generated what its magnitude and direction is. More advanced inertial systems employ what is called "velocity damping." These systems use some external source of velocity information such as a Dopper radar or a true air speed meter, or in the case of a ship, a pitometer log. These are able to damp out the Schuler oscillations, that is to say they are able to bring the indicated vertical into alignment with the true vertical so that the error is nulled out. Such a system is commonly called a damped Schuler tuned system. The Schuler tuned system would be the pure inertial system and the damped Schuler tuned system is the inertial system with external velocity information having a zero output error in the direction of the indicated vertical. These systems, however, customarily do not do anything about the error in the polar axis indication.

There is yet another more advanced inertial system that incorporates an additional feature. This is the so called SINS (ship's inertial navigation system). This system, which is a five-gimbal system specifically designed for the use on ships (vehicles whose speed is of the order of 30 knots), uses external velocity information from the ship's pitometer log, or some other means available for obtaining a measure of velocity. SINS damps the Schuler oscillation of the vertical axis and corrects one component of the error between the indicated polar axis and the true polar axis, the true polar axis being the axis of rotation of the earth which passes through the poles. The SINS makes a (theoretically derivable) correction to that component of the error angle of the indicated polar axis which tilts the indicated polar axis out of the local meridian plane. However, it does not make a theoretically derivable correction for the component of the error which lies in the meridian plane. This, of course, is not too important in a ship because of its slow rate of travel. For example, every six hours the earth goes through a quarter of a revolution so in the case of a stationary object, the component of error which is perpendicular to the meridian plane at one moment lies in the plane six hours later. Although the system would not be correcting the particular component of error at any given instant, six hours from that instant it will be. It is important for vehicles capable of greater speeds to correct both components of tilt of the indicated polar axis. Also it leads to greater navigation accuracy for vehicles at all speeds to correct both components of the polar axis error.

It is, therefore, an object of the present invention to provide an improved navigation system. Another object of the present invention is to provide an improved navigation system for vehicles of all speeds from zero to beyond orbital speeds, which corrects errors that cause the indicated directions to deviate from the true directions. A further object of the present invention is to provide an improved navigation system that corrects the two components of tilt of the indicated polar axis. An additional object of the present invention is to provide an improved navigation system that can be mechanized with a smaller, simpler physical package (four, three, or even no gimbals) for applications where size and/or weight are limited. Yet another object of the present invention is to provide an improved navigation system which subsumes the role of a gyrocompass, performing the function of a gyrocompass in indicating the direction of north for vehicles of all speeds, moving in any manner whatsoever.

The present invention is therefore a new, advanced form of gyrocompass useful for craft of all speeds. In accordance with the present invention there is provided a navigation system for an arbitrarily moving vehicle navigating in the vicinity of a gravitating, rotating body such as the earth. The navigation system comprises a means responsive to the acceleration of the vehicle for providing a first signal representative of the movement of the vehicle through space and a means for providing a second signal representative of the velocity of the vehicle with respect to a rotating body moving in space. The system also provides a means for combining the first and the second signals to provide a third signal representative of the movement of the body with respect to space. Means responsive to said third signal are then provided for indicating the true direction of the axis of rotation of said body.

For a better understanding of the present invention, together with other further objects thereof, reference is made to the following description taken in connection with the accompanying drawings and its scope will be pointed out in the appended claims.

There follows a glossary, including definitions, helpful in understanding the principles of operation of this invention and for ready reference in following the equations.

Glossary filed April 19, 1965.

GLOSSARY $\bar{a}$ indicated acceleration of the vehicle with respect to inertial space; equal to
$$\left.\frac{d^2\overline{R}}{dt^2}\right|_J$$

$\bar{a}_T$ true acceleration of the vehicle with respect to inertial space $b$ constant, that part of $PF_1$ which applies to the altitude channel $c$ constant $d$ a constant, part of $PF_2$ $\left.\frac{d\overline{R}}{dt^2}\right|_J$ derivative of $\overline{R}$ with respect to J frame; the inertial system's indicated craft velocity with respect to inertial space $\left.\frac{d^2\overline{R}}{dt^2}\right|_J$ second derivative of $\overline{R}$ with respect to J frame; indicated craft acceleration with respect to inertial space; equal to $\bar{a}$ $F_x$ indicated east acceleration of craft relative to earth $F_y$ indicated north acceleration of craft relative to earth $\bar{f}$ measured specific force; output of the accelerometers of the inertial system; equal to the measurement of the vector sum of the non-gravitational forces per unit mass acting on the vehicle; ideally equal to gravitation minus inertial acceleration acting on the vehicle. The following equation relates true specific force acting on the vehicle and true gravitation $\overline{G}_T$ to true vehicle acceleration $\bar{a}_T$: $\bar{f}_T = \overline{G}_T - \bar{a}_T$ or $\bar{a}_T = \overline{G}_T - \bar{f}_T$. The following equation relates specific force $\bar{f}$ as measured by the accelerometers to indicated gravitation $\overline{G}$, and indicated acceleration, $$\bar{a} = \left.\frac{d^2\overline{R}}{dt^2}\right|_J$$
$$\left.\frac{d^2\overline{R}}{dt^2}\right|_J = \overline{G} - \bar{f}$$

$F(L_c)$ the correction in the geocentric radius vector for the ellipticity of the earth $\bar{f}_T$ true specific force acting on craft $f_x, f_y, f_z$ $x, y, z$ components of $\bar{f}$; indicated east, north, and up components of measured specific force, i.e., the output of the east, north and vertical accelerometers $\overline{G}$ indicated gravitation vector; a programmed function of position in the inertial system $\overline{G}_T$ true gravitation vector; the force per unit mass acting on craft due to the gravitational attraction between the earth and the craft; the gradient of the earth's potential field; see "gravity," List of Definitions $G_{1X}, G_{1Y}, G_{1Z}$ the $x, y, z$ components of the component of G normal to $\bar{\gamma}$ at the indicated craft position $\bar{g}_T$ true gravity vector; the force per unit mass acting on a body at rest on the earth; related to true gravitation by the equation $$\bar{g}_T = \overline{G}_T - \overline{W}_{IE} \times (\overline{W}_{IE} \times \overline{R}_T)$$

| | | | |
|---|---|---|---|
| $h$ | geographic altitude | $\dot{R}_V, \ddot{R}_V$ | first and second time derivatives of $R_V$ |
| $\dot{h}$ | geographic altitude rate | | |
| I | the indicated inertial reference frame of the inertial sensor, carried by the craft, with axes X, Y, Z. This frame is explicitly mechanized in the four-gimbal example configuration. In the absence of misalignment, these axes are parallel respectively to the $X_T$, $Y_T$, $Z_T$ axes of the J frame. The origin of this frame is carried in the craft. | $R_{Vo}, \dot{R}_{Vo}$ | initial values of $R_V, \dot{R}_V$ |
| | | $R_x$ | radius of curvature of the earth at the craft location in a plane perpendicular to the meridian plane |
| | | $R_y$ | meridian plane radius of curvature of earth at craft location |
| | | $s$ | the differential operator $d/dt$; identical to $p$ (sometimes used in the literature) |
| $1/s$ | integration; see $s$ | $T_g, T_d$ | damping time constants (hours) |
| $i$ | the indicated position frame; the z-axis of this frame carries the indicated vector $\bar{R}$; origin in the craft; in the north-east-up embodiment, $x$ is along indicated east, $y$ along indicated north, and $z$ along indicated "up." | $t$ | Greenwich time |
| | | $\bar{U}$ | error velocity vector; the difference between the measured velocity relative to the earth, and the indicated velocity relative to the earth |
| | | $U_{East}$ | indicated east component of $\bar{U}$ |
| | | $U_{North}$ | indicated north component of $\bar{U}$ |
| J | (true) inertial frame; origin at the mass-center of the earth or other planet, axes non-rotating relative to the fixed stars; the $Z_T$ axis of this frame is parallel to the true polar axis, the $X_T$ axis in the case of the earth is parallel to the intersection of the equatorial plane and the Greenwich meridian at zero Greenwich time, and the $Y_T$ is parallel to the equatorial plane, so that $X_T$, $Y_T$, $Z_T$ form a right-handed system. | $\bar{V}_M$ | craft velocity with respect to the planet accurately as measured by a velocity sensor which is external to the inertial system |
| | | $V_{M1}, V_{M2}, V_{M3}$ | components of $\bar{V}_M$ along vehicle body axes |
| | | $V_{ME}, V_{MN}, V_{Mz}$ | components of $\bar{V}_M$ parallel to directions of indicated east, north, and up, respectively |
| | | $v$ | indicated north component of craft velocity relative to earth (scaled by $R_y T_g$); a damping variable |
| | | $\dot{v}$ | time derivative of $v$ |
| $K_E$ | damping constant (hours) | $W_{EC}$ | computed angular velocity east (corrected for polar axis tilt) |
| $\bar{k}$ | unit vector parallel to the indicated polar axis | $W_{EC}'$ | (uncorrected) computed angular velocity east due to craft motion with respect to earth |
| L | indicated geographic latitude | | |
| $L_c$ | indicated geocentric latitude | | |
| $\dot{L}$ | time rate of change of L | $\dot{W}_{EC}'$ | indicated angular acceleration east due to craft easterly acceleration relative to earth |
| $\dot{L}_c$ | time rate of change of $L_c$ | | |
| $L_o$ | initial value of L | | |
| $l$ | indicated geographic longitude | $W_{IE}$ | magnitude of the true angular velocity of the earth with respect to inertial space |
| $\dot{l}$ | indicated geographic longitude rate | | |
| $l_I$ | indicated inertial longitude | | |
| $\dot{l}_I$ | time rate of change of $l_I$ | $\bar{W}_{IE}$ | indicated vector angular velocity of earth with respect to inertial space |
| $l_o$ | initial value of geographic longitude | | |
| $m$ | constant value, +1, 0 or −1 for augmented, uniform, or diminished torquing, respectively. | $\bar{W}_{JI}$ | angular velocity of I-frame with respect to the J frame, which results from rotating the I-frame relative to inertial space by torquing the gyros for the purpose of aligning the indicated polar axis with the true polar axis |
| $PF_1(\ )$, $PF_2(\ )$, $PF_2'(\ )$, $PF_2''(\ )$, $PF_2'''(\ )$, $PF_2''''(\ )$ | arbitrary functions of the operands; may be tensor, vector, or scalar operators, and may include differentations, integrations, etc. | | |
| | | $W_{JIX}, W_{JIY}$ | X and Y components of $\bar{W}_{JI}$; commands for polar axis erection |
| $\bar{Q}$ | $\bar{\gamma} \times \bar{U}$ = signal proportional to velocity error | $W_{Ji}$ | angular velocity of I frame with respect to inertial space J |
| $Q_X, Q_Y, Q_Z$ | components of $\bar{Q}$ along X, Y and Z | $W_{JiX}, W_{JiY}, W_{JiZ}$ | X, Y, Z components of $\bar{W}_{Ji}$ |
| $\bar{R}$ | indicated geocentric position vector | $\dot{W}_{JiX}, \dot{W}_{JiY}, \dot{W}_{JiZ}$ | time derivatives of $W_{JiX}, W_{JiY}, W_{JiZ}$ |
| R | magnitude of indicated position vector $\bar{R}$ | $W_{JiX}(0), W_{JiY}(0), W_{JiZ}(0)$ | initial values of $W_{JiX}, W_{JiY}, W_{JiZ}$ |
| $\dot{R}$ | time rate of change of R; (geocentric) altitude rate | | |
| $\ddot{R}$ | second rate of change of magnitude of indicated position vector $\bar{R}$; that is, vertical acceleration | $W_{JI_{IE}}$ | component of $\bar{W}_{JI}$ parallel to the direction of indicated east; rate of correction of that component of polar axis tilt lying in the local meridian plane |
| $R_E$ | average radius of the earth | | |
| $\bar{R}_T$ | true position vector of the craft from the mass-center of the planet to the craft position | $W_{JI_\delta}$ | component of $\bar{W}_{JI}$ parallel to $\bar{\delta}$; rate of correction of that component of polar axis tilt normal to the local meridian plane |
| $R_T$ | magnitude of $\bar{R}_T$ | | |
| $R_V$ | value of R for present craft position determined from inertial altitude channel | $W_{NC}'$ | (uncorrected) computed north component of angular velocity due to craft motion with respect to earth |

| Symbol | Definition |
|---|---|
| $\dot{W}_{NC}'$ | indicated angular acceleration north due to craft linear northerly acceleration relative to earth |
| $W_X =$ | $W_{J1\bar{X}} - W_{J1X}$ |
| $W_Y =$ | $W_{J1\bar{Y}} - W_{J1Y}$ |
| $W_Z =$ | $W_{J1z}$ ($W_{J1Z} = 0$) |
| $x, y, z$ | axes of the I-frame; indicated east, north, and up respectively |
| $X, Y, Z$ | axes of the indicated inertial frame I; for direction of these axes; see entry under I |
| $X_T, Y_T, Z_T$ | axes of the true inertial frame J; for directions of these axes, see entry under J |
| $X, Y, Z$ | axes of the indicated inertial system I with X indicating the intersection of the equatorial plane and Greenwich meridian at zero Greenwich time, Z along the indicated polar axis, and Y at right angles to form the right-handed set X, Y, Z |
| $w$ | indicated east component of craft velocity relative to earth (scaled by $R_x T_s$); a damping variable |
| $\dot{w}$ | time derivative of $w$ |
| $\bar{\gamma}$ | unit vector in the direction of the indicated vertical (positive upward) |
| $\gamma_X, \gamma_Y, \gamma_Z$ | X, Y, Z components of $\bar{\gamma}$ |
| $\dot{\gamma}_X, \dot{\gamma}_Y, \dot{\gamma}_Z$ | time derivatives of $\gamma_X, \gamma_Y, \gamma_Z$ |
| $\bar{\delta}$ | unit vector parallel to the intersection of the indicated meridian plane with the indicated equatorial plane, positive outward from the planet center toward the craft position |
| $\gamma_X(0), \gamma_Y(0), \gamma_Z(0)$ | initial values of $\gamma_X, \gamma_Y, \gamma_Z$ |
| $\bar{1}_E$ | unit vector parallel to indicated east |
| $\bar{1}_{PAD}$ | unit vector in the direction of the dynamic polar axis |
| $\bar{1}_{PA_i}$ | unit vector in the direction of the indicated polar axis, given as the Z axis of the I-frame |
| $\bar{1}_{PA_T}$ | unit vector in the direction of the true polar axis |

Figure 1:
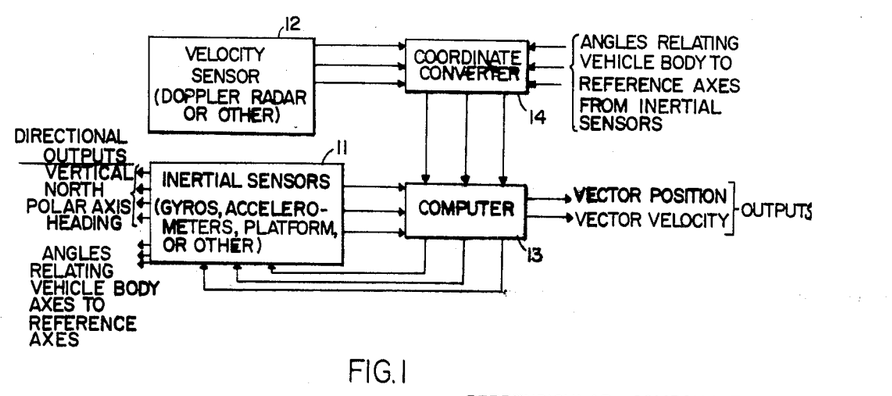
FIG. 1 is a generalized schematic diagram of the navigation system of the present invention.

Referring to FIG. 1 of the drawing, there is shown a generalized block diagram of a navigation system embodying the invention. This navigation system comprises inertial sensors 11, velocity sensor 12, computer 13, and a coordinate converter 14, which may or may not be a part of a computer 13. The velocity sensor 12 comprises a Doppler radar system, pitometer log, or other measuring means capable of measuring the velocity of a vehicle with respect to a body moving in inertial space, such as the earth. The inertial sensors 11, for example, include gyros, accelerometers and the like which comprise a means for determining a signal representative of velocity of a vehicle with respect to inertial space. The computer 13 and coordinate converter 14 comprises a means for combining the signal from velocity sensor 12 and the signal from inertial sensor 11 to provide a signal representative of the velocity of a body, such as the earth, with respect to inertial space.

Figure 2:
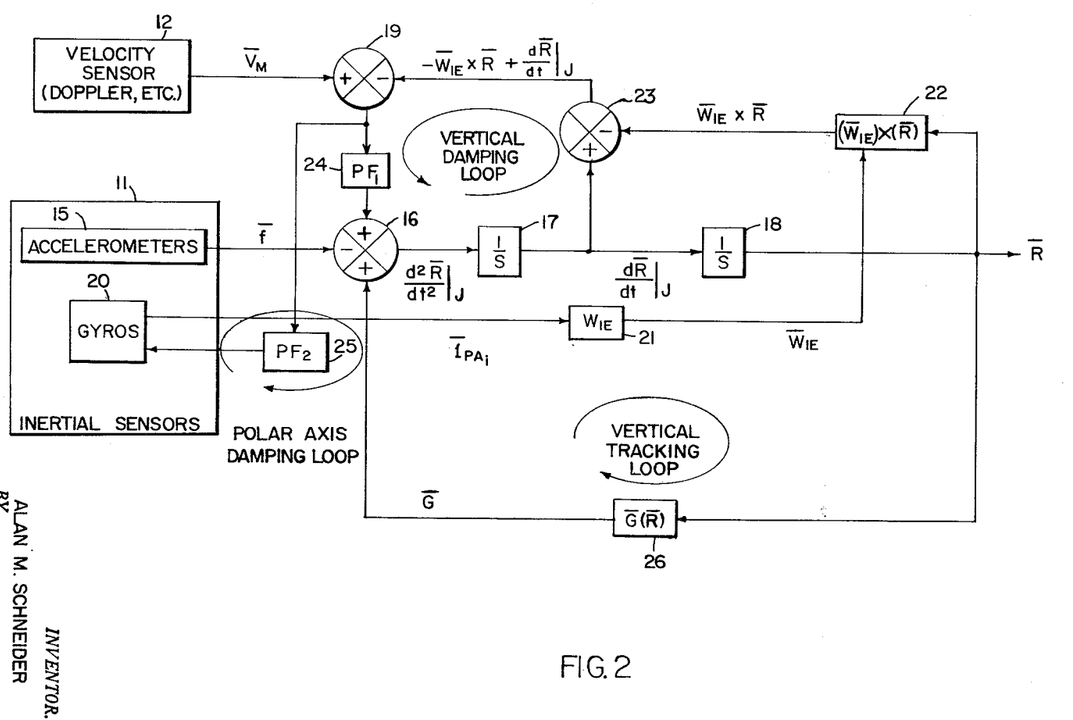
FIG. 2 is a vector representation of the system concept of the navigation system of the present invention.

In considering the operation of the generalized system just described it will be noted that FIG. 2 illustrates a vector representation of the system concept. One signal from the inertial sensors 11 is termed and is representative of the measured specific force, $\bar{f}$. Measured specific force is related to inertial acceleration $a$ and $\bar{G}$ gravitation by the relation $\bar{f} = \bar{G} - \bar{a}$, or $\bar{a} = \bar{G} - \bar{f}$. Specific force is the vector output; for example of accelerometers 15. Thus the accelerometers measure (the negative of) acceleration in a zero gravitational field. This signal is applied subtractively to a vector combiner 16, the output of which is applied in turn to the vector integrator 17. Also applied to combiner 16 is the indicated gravitation vector $\bar{G}$ obtained as the output of vector function generator 26. This adds the gravitation component to the negative of the specific force measurement, so that the input to vector integrator 17 is representative of the indicated inertial acceleration. The output of the vector integrator 17 is, therefore, representative of the indicated inertial velocity. The indicated inertial velocity may then be integrated, for example, by means of vector integrator 18 to provide the indicated inertial position $\bar{R}$ or geocentric indicated position vector.

The output of velocity sensor 12 is representative of the measured vehicle velocity relative to the earth and is herein referred to as $\bar{V}_M$. This is applied to vector combiner 19.

Another output from inertial sensors 11 is representative of the direction of the indicated polar axis and will be referred to as the unit vector $\bar{1}_{PA_i}$. The source of this signal may be, for example, an orientation in space established by the gyros 20. The signal is then applied to the multiplier 21 which multiplies the unit vector $\bar{1}_{PA_i}$ by the value $W_{IE}$ which is the magnitude of earth rate (the angular velocity of the earth with respect to inertial space) to provide the earth rate vector $\bar{W}_{IE}$. The vector representation of earth rate corresponds to the polar axis pointing toward North since the earth rotates from West to East. Its magnitude is very nearly $2\pi$ radians per sidereal day. The signal is then applied to the vector cross-product multiplier 22 to which is applied the output of integrator 18, the indicated inertial position $\bar{R}$. The output of vector multiplier 22 thereby provides the velocity of the local earth point, $\bar{W}_{IE} \times \bar{R}$, which is in turn applied to the vector combiner 23. The combiner 23 subtractively combines the velocity of the local earth point, $\bar{W}_{IE} \times \bar{R}$ with the indicated inertial velocity $$\left.\frac{d\bar{R}}{dt}\right|_J$$

provided by the vector integrator 17. The expression $$\left.\frac{d\bar{R}}{dt}\right|_J$$

is the time derivative of $\bar{R}$ with respect to the J reference frame, defined below. This expression is representative of the inertial system's indication of vehicle velocity with respect to inertial space. Combiner 23 provides the inertial system's indication of vehicle velocity with respect to the earth. When this is fed back to the vector combiner 19 to combine the indicated vehicle velocity with respect to the earth with the measured vehicle velocity with respect to the earth, an output is derived which is the error or discrepancy between the two. This error is processed through the generators 24 and 25 of vector performance functions $PF_1$ and $PF_2$, respectively. The output of generator 24 is applied to vector combiner 16. The output of generator 24 is the Schuler-loop damping signal, which drives the direction of the indicated vertical toward or to the direction of the true vertical. The output of generator 25 is representative of the commanded angular velocity $\bar{W}_{JI}$ of the I-frame established by the inertial sensors 11 with respect to the inertial frame J. This is the command which erects the indicated polar axis of the inertial system, the indicated polar axis being fixed in the I-frame. The origin of the (true) inertial frame J remains fixed at the center of the earth; the origin of the I-frame moves with the craft.

Such a system is, therefore, capable of solving the following basic vector equations:

(1) $$\left.\frac{d^2\overline{R}}{dt^2}\right|_J = \overline{G} - \overline{f} + PF_1\left[\overline{V}_M + \overline{W}_{IE} \times \overline{R} - \left.\frac{d\overline{R}}{dt}\right|_J\right]$$

(2) $$\overline{W}_{JI} = PF_2'[\overline{1}_{PA_D} - \overline{1}_{PA_i}] = PF_2\left[\overline{V}_M + \overline{W}_{IE} \times \overline{R} - \left.\frac{d\overline{R}}{dt}\right|_J\right]$$

where $\overline{R}$ = the indicated geocentric position vector, $t$ = Greenwich time, $I$ = the indicated inertial reference frame of the inertial sensor, $J$ = the (true) inertial frame; $\overline{G}$ = the indicated gravitation vector, a function of the indicated position.

$\overline{f}$ = measured specific force defined in the glossary.

$PF_1$, $PF_2$, $PF_2'$ = arbitrary functions of the operands. These may be tensor, vector, or scalar operators, and may include differentiations, integrations, etc. The operand appears to the right. $\overline{V}_M$ = measured velocity of the craft with respect to the earth obtained from a secondary source external to the given inertial system. $\overline{W}_{IE}$ = the indicated angular velocity of the earth with respect to inertial space.

$$\left.\frac{d\overline{R}}{dt}\right|_J$$

= time derivative of $\overline{R}$ with respect to the J reference frame; that is inertially indicated craft velocity with respect to inertial space.

$$\left.\frac{d^2\overline{R}}{dt^2}\right|_J$$

= second time derivative of $\overline{R}$ with respect to the J reference frame; that is, the indicated inertial acceleration. $\overline{W}_{JI}$ = angular velocity of the I-frame with respect to inertial space J, obtained by torquing the gyros, or commanding an angular rate of the I-frame with respect to the J-frame. $\overline{1}_{PA_D}$ = a unit vector along the "dynamic polar axis, defined below. $\overline{1}_{PA_i}$ = a unit vector along the indicated polar axis; that is, a unit vector along a fixed axis of the I-frame.

The dynamic polar axis is that direction in space which, if it were the direction of an axis through the center of the earth about which the earth were to rotate at an angular rate $W_{IE}$, would impart to the local earthpoint the velocity with respect to inertial space that the combination of inertial sensors and external velocity sensor shows to exist. The local earthpoint is an imaginary point fixed relative to the earth and lying on the same instantaneous indicated vertical as the craft, at the same indicated altitude. The velocity of the local earthpoint with respect to inertial space, as indicated by the combination of inertial sensors and external velocity sensor, is determined as the difference between the velocity of the craft with respect to inertial space as indicated by the inertial sensors, and the velocity of the craft with respect to the earth, as measured by the external velocity sensor. The dynamic polar axis is the system's best representation of the direction of the earth's true polar axis. The system of this invention compares the direction of the indicated polar axis with that of the dynamic polar axis. If the two do not agree, the indicated is presumed to be in error. The system then rotates the indicated polar axis toward the dynamic polar axis at a rate dependent upon the magnitude of the separation, and also dependent on the operator $PF_2'$. This is the physical meaning of the first form of equation 2. The second form of this equation is a way of computing the first form with readily-available signals.

As previously indicated, there are several, in fact, probably an infinite number, of different ways of configuring the physical arrangement of the elements comprising the navigation system of the present invention. All configurations mechanize the same basic vector Equations 1 and 2, as indicated above, which, therefore, underlie all configurations. The two alternative forms in Equation 2 can be shown to be equivalent. Different sets of equations to be instrumented can be obtained for each different way of configuring the system, for different choices of computational reference frames, and for different choices of the operators $PF_1$ and $PF_2$ or $PF_2'$.

Figures 3, 4:
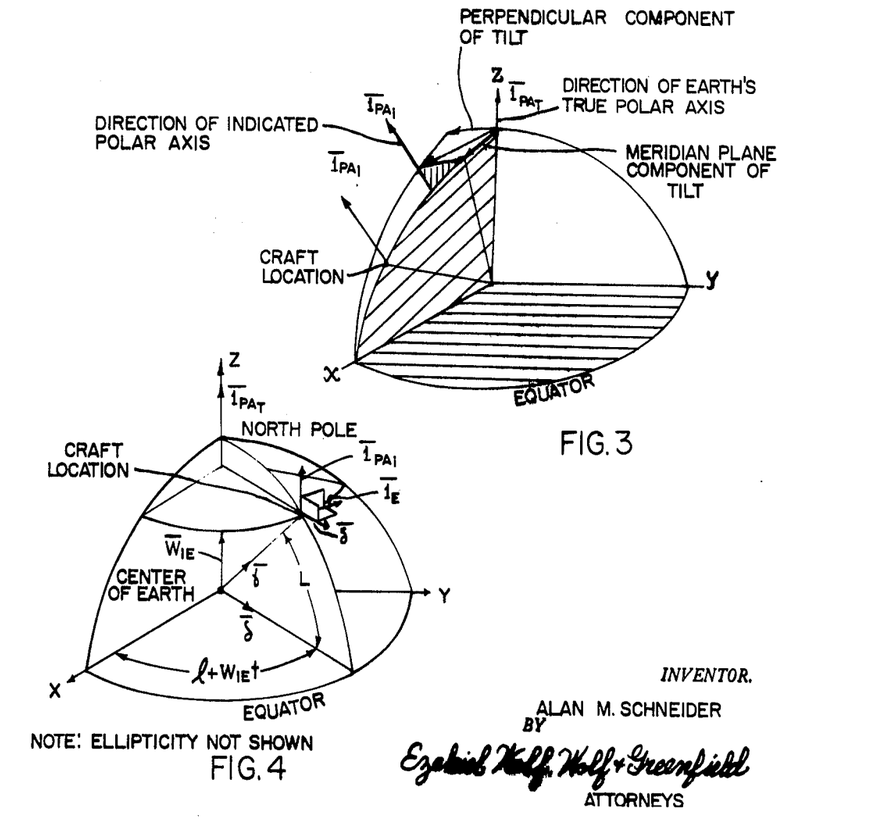
FIG. 3 is an illustration of the common coordinates used to specify the two components of tilt of the indicated polar axis with respect to the true polar axis.
FIG. 4 is an illustration of the coordinate axes used in a 5 gimbal configuration navigation system embodying the present invention.
Figure 5:
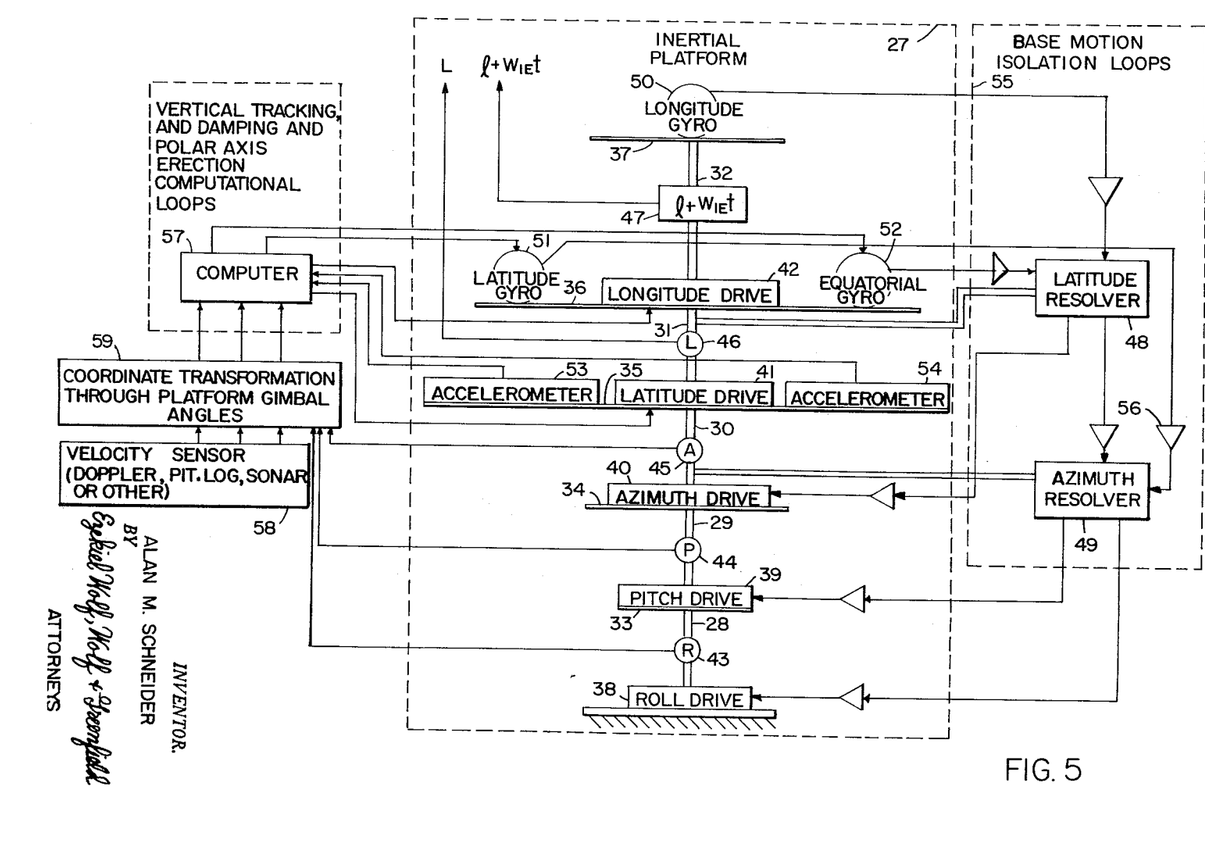
FIG. 5 is a 5 gimbal configuration system block diagram of a navigation system embodying the present invention.
Figure 6:
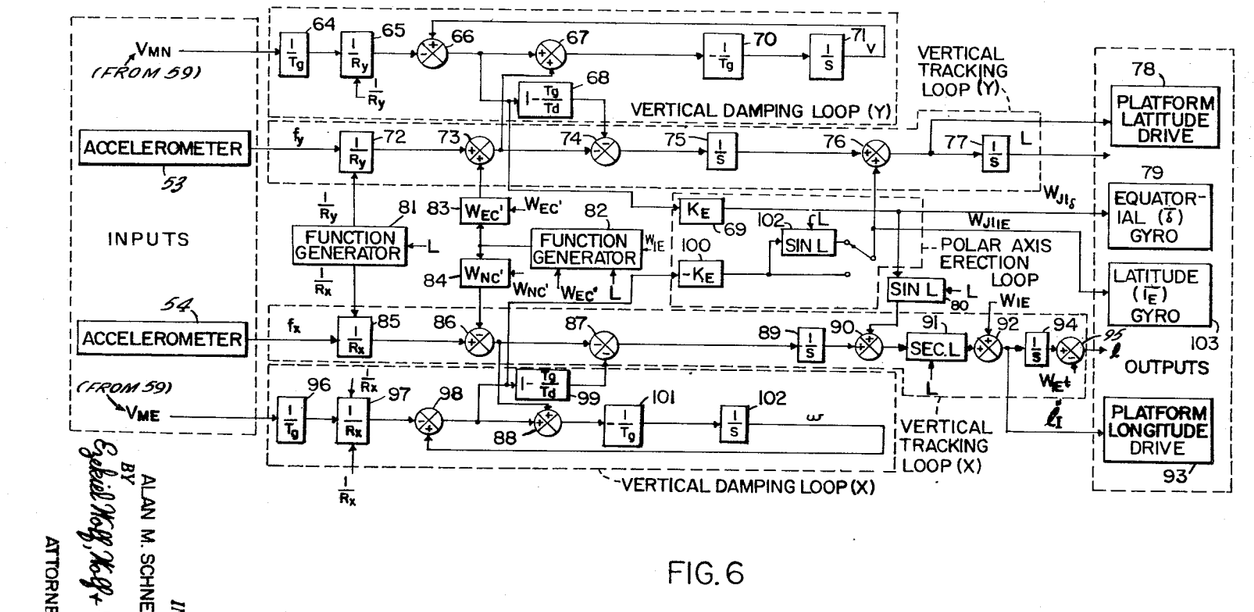
FIG. 6 is a diagram of a computer used in a 5 gimbal embodiment of the navigation system of the present invention.

The configuration illustrated in FIGS. 4 through 6 inclusive is an example of one way in which the system elements can be arranged to solve the equations above. The system comprises firstly a five gimbal platform mounting three single-degree-of-freedom gyros and two (or three) single-degree-of-freedom accelerometers. Such instruments are adequately described in the prior art. The platform is complete with the usual gimbal axis, drives, resolvers, and signal generators (pickoffs) for gimbal angle measurement. This platform and associated inertial components constitute the inertial sensor of the navigation system of the present invention. The second element of the system comprises the Doppler radar system, sonar system, pitometer log, or other device for measuring velocity of the vehicle with respect to the earth. This device is the "velocity sensor" of the navigation system of the present invention. The third portion of the system comprises a computer which processes the output of the inertial sensor and the velocity sensor. The fourth portion of the system includes the necessary interconnections, power supplies and desired displays.

This set of equipment properly connected as in the following description, constitutes one embodiment configuration of the navigation system of the present invention.

The velocity outputs of the velocity sensor and the specific force outputs from the accelerometers of the inertial sensor are the basic inputs to the computer, which combines the measured data in such ways as to produce the outputs of the navigation system of the present invention.

The velocity sensor makes a direct measurement of the vehicle velocity vector with respect to the earth. The vector output of this sensor is obtained directly as, or else transformed into, components in the stable platform reference frame, i.e. the indicated north and indicated east components. If a transformation is required to obtain these components, the angles which relate the platform reference system to the body axes of the vehicle are obtained from the gimbal angles, using the gimbal angle pickoffs of the inertial sensor.

Referring more particularly to FIG. 5, the inertial sensor 27 includes five gimbals. The order of the gimbal axes from outermost to innermost, is: the roll gimbal axis 28, pitch gimbal axis 29, azimuth gimbal axis 30, latitude gimbal axis 31, and longitude gimbal axis 32. The names of the gimbals themselves, in order from outermost to innermost (not counting the frame of the vehicle to which the outermost gimbal axis is rigidly attached), are: roll gimbal 33, pitch gimbal 34, azimuth gimbal 35, latitude gimbal 36 and longitude gimbal 37. Each gimbal axis has a drive, for example, roll drive 38, pitch drive 39, azimuth drive 40, latitude drive 41 and longitude drive 42; and an angular pickoff such as roll pickoff 43, pitch pickoff 44, azimuth pickoff 45, latitude pickoff 46 and longitude pickoff 47. The axes are also provided with resolvers such as latitude resolver 48 and azimuth resolver 49. In every case, the rotor of each of these instruments is attached to one gimbal, and the stator to the other, so that relative motion between the two gimbals along the common axis is both possible and measureable.

The sensitive input axis of each of the three gyros is positioned to form the rectangular reference frame I as follows:

| Gyro Name | Direction of Input Axis | Unit Vector Label |
|---|---|---|
| Longitude gyro 50 | Parallel to longitude gimbal axis 32. | $\bar{k}\,(=\bar{1}_{PA_i})$ |
| Latitude gyro 51 | Parallel to latitude gimbal axis 31 | $\bar{1}_E$ |
| Equatorial gyro 52 | Perpendicular to both latitude gimbal axis 31 and longitude gimbal axis 32. | $\bar{\delta}$ |

These directions are illustrated in FIG. 4. The unit vectors $\bar{k}$, $\bar{1}_E$, and $\bar{\delta}$ given above are parallel to the direction of the input axis indicated for the gyro. They provide a convenient label for identifying each gyro. The cases of the gyros are rigidly attached to the gimbal frames as follows: the longitudinal gyro 50 is attached to the longitude gimbal frame; the latitude gyro 51 to the latitude gimbal frame and the equatorial gyro 52 to the latitude gimbal frame.

The directions of the gimbal axes provide indications of significant directions in the system. Unit vectors for these directions are assigned. The actual direction indicated will generally differ from the nominal or corresponding true direction by a small angle, which the action of the system will tend to minimize. These directions, defined in the following table, are illustrated more particularly in FIG. 4.

| Name | Unit Vector | Physical Representation of Direction | Nominal Direction |
|---|---|---|---|
| Indicated Polar Axis | $\bar{k}(=\bar{1}_{PA_i})$ | Longitude Gimbal Axis | Parallel to Direction of Earth's Polar Axis; Positive Toward North Pole. |
| Indicated East | $\bar{1}_E$ | Latitude Gimbal Axis | Parallel to the Direction of East at the Craft's Instantaneous Position on Earth. |
| Indicated Geodetic Vertical. | $\bar{\delta}$ | Azimuth Gimbal Axis | Parallel to the Vertical, Positive Up. |

In addition, the unit vector $\bar{\delta}$ is nominally parallel to the equatorial plane of the earth, and parallel to the plane of the local meridian. Physically, it would be presented by the mutual perpendicular to the longitude gimbal axis 32 and the latitude gimbal axis 31. The angle of relative rotation between certain gimbals about the intermediate (common gimbal axis provides a physical indication of certain variables in the guidance problem. These are: First, the angle of rotation of longitude gimbal 37 with respect to latitude gimbal 36 about the longitudinal gimbal axis 32 is the indicated inertial longitude $l_I$, which is equal to the longitude $l$, plus earth rate times time, $W_{IE}t$. Thus $l_I = l + W_{IE}t$. Second, the angle of rotation of the latitude gimbal 36 with respect to the azimuth gimbal 35 about the latitude gimbal axis 31 is the indicated co-latitude (90° minus latitude).

The two single-axis accelerometers 53 and 54 of the system are physically attached to the azimuth gimbal 35, with their sensitive axes parallel to indicated east and indicated north for the $x$ and $y$ accelerometers 54 and 53 respectively. These accelerometers 53 and 54, therefore, measure the indicated east and indicated north components of the vector specific force. The specific force vector components $f_x$ and $f_y$ are the outputs of the accelerometers, where $x$ and $y$ are the indicated directions of east and north respectively. The $x$ and $y$ axes, together with the indicated vertical or $z$ axis, constitute the platform reference frame. The base-motion isolation loops maintain the azimuth, latitude and longitude gimbals 35, 36 and 37 in their preferred orientation in spite of the roll, pitch, and yaw motions of the supporting vehicle. Their interconnection 55 follows standard techniques described in the prior art. Specifically, if any of the gyros is disturbed from its preferred orientation, by virtue of a component of rotation of the gimbal platform to which it is attached parallel to its input axis, say for example the latitude gyro 51, it then develops a base-motion isolation signal which travels outward from the gyro along the connection as illustrated in FIG. 5. This signal, amplified by amplifier 56 and properly resolved through the azimuth resolver 49, forms a drive command to various of the roll, pitch, and/or azimuth drives, more particularly pitch and roll drives 39 and 38 of the embodiment of FIG. 5. These drives restore the gimbal carrying the gyro to its proper orientation in space. The directions of the sensitive axes of the gyros do not, in general, correspond with the directions of the axes about which the drives can act. The resolvers shown in FIG. 5 "sort out" the gyro signals, routing them to the proper drive to achieve the corrective action about the proper axial direction.

The latitude and longitude drive signals are generated in the computer 57 as indicated latitude rate and indicated inertial longitude rate. The latitude drive 41 causes the latitude gimbal 36 to rotate with respect to the azimuth gimbal 35 about the latitude gimbal axis 31. The longitude drive signal causes the longitude gimbal 37 to rotate with respect to the latitude gimbal 36 about the longitude gimbal axis 32. These drive signal paths are illustratated as outputs of the computer 57.

A final pair of signals must also be considered. These are the latitude and equatorial gyro torque commands (angular velocity commands) sent from the computer 57 to the torque coils of the two gyros concerned. These commands $W_{JI_{1E}}$ and $W_{JI_\delta}$ are the means by which the platform 27 is made to correct the direction of the indicated polar axis. The commands cause the latitude gimbal 36 to rotate with respect to inertial space at a rate proportional to the components of the command, with components of angular velocity vector parallel to the latitude and equatorial gyro input axes respectively ($\bar{1}_E$ and $\bar{\delta}$). This action corrects both components of tilt of the indicated polar axis, the meridian component and the perpendicular component, illustrated in FIG. 3. This action is the so-called polar axis erection which is characteristic of the navigation system of the present invention.

As mentioned above, a velocity sensor 58, which may be a Doppler radar, pitometer log, sonar or other type, provides vector outputs of the vehicle-axis components of measured velocity with respect to the earth $V_{M1}$, $V_{M2}$, $V_{M3}$. Coordinate transformer 59 transforms these components into leveled platform reference frame velocity vector components in the east, north and vertical directions, $V_{ME}$, $V_{MN}$ and $V_{Mz}$. The angles which relate the platform reference system to the body axes of the vehicle are obtained from the gimbal angles using the gimbal angle pickoffs, such as the azimuth pickoff 45, pitch pickoff 44 and roll pickoff 43, for example, of the inertial sensor. Referring now to FIG. 6 there is here shown an example of a computer such as the computer 57 of FIG. 5. This block diagram is typical of a computer which might be used with the five gimbal inertial platform. The inputs to the computer are $V_{MN}$ (the resolved external velocity measurement in the north direction from the Doppler, pitometer log, or other) from 59, $V_{ME}$ (the resolved external velocity measurement in the east direction) from 59, $f_y$ the $y$ accelerometer output (from inertial platform) 53, and $f_x$ the $x$ accelerometer output 54. $V_{Mz}$, the vertical component of the resolved external velocity is ignored for the purpose of this diagram. The computer solves the set of vector Equations 1 and 2 given above, in terms of an equivalent set of scalar, or component, equations. The mechanization of these scalar equations is shown in FIG. 6. The equations to be computed by this five gimbal configuration are as follows:

$$\frac{F_y}{R_y} = \frac{f_y}{R_y} + (2W_{IE} + W_{EC}' \sec L)W_{EC}' \sin L$$

$$-\frac{F_x}{R_x} = -\frac{f_x}{R_x} + (2W_{IE} + W_{EC}' \sec L)W_{NC}' \sin L$$

$$\dot{W}_{NC}' = -\frac{F_y}{R_y} - \left(1 - \frac{Tg}{Td}\right)\left(v - \frac{V_{MN}}{R_y T_g}\right)$$

$$\dot{W}_{EC}' = -\frac{F_x}{R_x} - \left(1 - \frac{Tg}{Td}\right)\left(w - \frac{V_{ME}}{R_x T_g}\right)$$

$$\dot{v} = -\frac{1}{T_g}\left(\frac{F_y}{R_y} + v - \frac{V_{ME}}{R_y T_g}\right)$$

$$\dot{w} = -\frac{1}{T_g}\left(\frac{F_x}{R_x} + w - \frac{V_{ME}}{R_x T_g}\right)$$

$$W_{JI_\delta} = K_E\left(v - \frac{V_{MN}}{R_y T_g}\right)$$

$$W_{JI_{1E}} = -E(1/\sin L)^m K_E\left(w - \frac{V_{ME}}{R_x T_g}\right)$$

$$\begin{cases} m = -1 \text{ "Diminished torquing"} \\ m = 0 \text{ "Uniform torquing"} \\ m = 1 \text{ "Augmented torquing"} \end{cases}$$

$$\dot{L} = W_{NC}' + W_{JI_{1E}} \qquad L = L_0 + \int_0^t \dot{L}dt$$

$$W_{EC} = W_{EC}' + W_{JI_\delta} \sin L$$

$$\dot{l} = W_{EC} \sec L$$

$$\dot{l}_I = \dot{l} + W_{IE}$$

$$l = \int_0^t \dot{l}_I dt + l_0 - W_{IE} t$$

The signal representative of $V_{MN}$ is applied to the multiplier 64 which performs the function of multiplying the signal from 59 representative of $V_{MN}$ by a value of $1/T_g$ where $T_g$ is a damping time-constant (part of $PF_1$ and $PF_2$). The signal representative of this product is then applied to the multiplier 65 which multiplies the above product by the value $1/R_y$ obtained from 81, where $R_y$ is the meridian radius of curvature of the earth. The output of the multiplier 65 is then in turn applied to the algebraic combiner 66, whose output is applied to algebraic combiner 67, multiplier 68 and multiplier 69. The output of the algebraic combiner 67 is then applied to the multiplier 70 which serves to multiply the input expression by a value of minus $1/T_g$. This, in turn, is applied to the integrator 71 which operates on the expression to give a value representative of $v$ which is a damping variable. This value is then fed back to the algebraic combiner 66. The output of the $y$ accelerometer 53 is a signal $f_y$ which is representative of the component of specific force along the $y$ axis. This signal is applied to the multiplier 72 which serves to multiply the value $f_y$ by the value $1/R_y$ to provide an output signal representative of $f_y/R_y$. This output is then applied to the algebraic combiner 73 where it is combined with Coriolis corrections from the multiplier 83 to yield a signal representative of $F_y/R_y$. Since the reference frame established by the earth's axes is rotating and Newton's Law was not meant to be applied to rotating reference frames, the correction in the form of a synthetic force is introduced having a magnitude dependent on the rate of rotation of the reference. This synthetic force represents the so-called Coriolis correction. The output of the algebraic combiner 73 is then applied to both the algebraic combiner 67 and algebraic combiner 74. Also applied to the algebraic combiner 74 is the output of the multiplier 68 which is representative of the value of the product of the output of algebraic combiner 66 and the value $$1 - \frac{T_g}{T_d}$$

where $T_d$ is another damping time constant. This now provides an output from the algebraic combiner 74 which is representative of the value of $$-\frac{F_y}{R_y} - \left(1 - \frac{T_g}{T_d}\right)\left(v - \frac{V_{MN}}{R_y T_g}\right)$$

This is then applied to the integrator 75 and thence to the algebraic combiner 76. The output of combiner 76 when integrated by integrator 77 will provide a signal representative of the indicated geographic latitude. The signal from algebraic combiner 76 is also applied directly to the platform latitude drive 78 as shown in FIG. 6 to maintain the gimbals properly oriented as the vehicle moves to a new latitude.

As stated above, the output of the algebraic combiner 66 is applied to the multiplier 69 which in turn produces an output representative of $W_{JI_\delta}$ which signal may be used as a command for the equatorial gyro 79. This signal is also applied to the multiplier 80.

Also included in the system is a function generator 81. The input to this function generator is L from integrator 77. The function generator has outputs representative of the reciprocal of the meridian and perpendicular radii of the earth or a reference ellipsoid, such as the Hayford ellipsoid, taken at the indicated vehicle position. (The Hayford ellipsoid is one of several ellipsoids used as a mathematical figure to represent the shape of the earth). These values are designated $1/R_y$ and $1/R_x$ respectively. In addition there is a function generator 82. Inputs to this function generator are L from 77, $W_{EC}'$ from 89, and the known constant $W_{IE}$. This function generator has an output representative of $(2W_{IE} + W_{EC}' \sec L)\sin L$, where L is the indicated geographic latitude; $W_{IE}$ is the magnitude of the angular velocity of the earth with respect to inertial space (earth rate), and $W_{EC}'$ is the computed eastward angular velocity less the correction for the component of polar axis tilt normal to the local meridian plane. The output of the function generator 82, $(2W_{IE} + W_{EC}' \sec L)\sin L$, is applied to each of the two multipliers 83 and 84 as illustrated to produce terms known as Coriolis correction terms, $(2W_{IE} + W_{EC}' \sec L)W_{EC}' \sin L$ and $(2W_{IE} + W_{EC}' \sec L)W_{NC}' \sin L$, respectively.

The $x$ accelerometer 54 has an output representative of $f_x$ which is the component of specific force along the $x$ axis. This, in turn, is applied to the multiplier 85 to provide a signal representative of the expression $f_x/R_x$. This signal is then applied in turn to the algebraic combiner 86 which combines the latter mentioned function with the output $(2W_{IE} + W_{EC}' \sec L)W_{NC}' \sin L$ of the multiplier 84. The output of the algebraic combiner 86 is applied both to the algebraic combiner 87 and algebraic combiner 88. The output of the algebraic combiner 87 is representative of an expression equal to the time derivative of $W_{EC}'$. This time derivative may then be applied to the integrator 89 to provide a signal representative of $W_{EC}'$. The value $W_{EC}'$ may then be algebraically added to the value $W_{JI_\delta} \sin L$ which is represented by the signal output of the multiplier 80. Combination takes place in algebraic combiner 90, the output of which is applied to the multiplier 91 which multiplies this output by the value $\sec L$. The output of the multiplier 91 thereby represents a value equivalent to the time derivative of the geographic longitude. This is then combined in algebraic combiner 92 with $W_{IE}$, the magnitude of earth rate and the output used as a signal to control the platform longitudinal drive 93. The output may also be applied to the integrator 94 and thence to algebraic combiner 95 where the value $W_{IE}t$ is subtracted to provide an output equivalent to the geographic longitude.

A signal representative of the value $V_{ME}$ (the resolved external velocity measurement in the east direction) 61 is applied to the multiplier 96 to provide a product of $V_{ME}$ and $1/T_g$. This product is then multiplied by the value $1/R_x$ in the multiplier 97 to provide a product $V_{ME}/R_xT_g$ which is applied to the algebraic combiner 98. The output of the algebraic combiner 98 is applied to the algebraic combiner 88, the multiplier 99 and the multiplier 100. The multiplier 99 multiplies this value by a signal representative of the expression $$1 - \frac{T_g}{T_d}$$

to provide a product signal which is applied to the algebraic combiner 87. The algebraic combiner 88 combines the output of algebraic combiner 98 and the output of algebraic combiner 86. This is in turn multiplied by the value $$-\frac{1}{T_g}$$

in multiplier 101, integrated by integrator 102, and fed back to the algebraic combiner 98. The output of algebraic combiner 98, which is fed also to multiplier 100, is multiplied by the value $-K_E$, the result of which is applied to a switch to provide for either "uniform torquing," or when multiplied by sin L in multiplier 102 will provide "diminished torquing," corresponding to two different choices for $PF_2$. The signal from the switch is applied to the algebraic combiner 76 and to the latitude gyro 103. The choice made for $PF_1$ in this system configuration, involving integrators 71 and 102, imparts third-order damping, or "differentiated techometric feedback," to the damping of the Schuler oscillations.

In the five gimbal configurations of the present invention described, the choice of $PF_1$ is as follows:

$$PF_1 = \frac{\frac{T_d - T_g}{T_g T_d} s}{s + \frac{1}{T_d}}$$

where $T_g, T_d$ = damping constants
$s$ = differential operator $d/dt$, differentiations being taken with respect to the local geographic reference frame (east, north, up).

The choice for $PF_2$ is made in the following manner, beginning with Equation 2.

$$\overline{W}_{JI} = PF_2'[\overline{1}_{PA_D} - \overline{1}_{PA_i}]$$

Define a new function $PF_2''$ such that $$PF_2'[\overline{1}_{PA_D} - \overline{1}_{PA_i}] = PF_2''[\overline{1}_{PA_i} \times (\overline{1}_{PA_D} - \overline{1}_{PA_i})]$$

Define a vector $$\overline{U} = \overline{V}_M + \overline{W}_{IE} \times \overline{R} - \frac{d\overline{R}}{dt}\bigg|_J$$

to represent one of the bracketed quantities of Equations 1 and 2.

Then it can be shown that $$\overline{W}_{JI} = PF_2''[\overline{1}_{PA_i} \times (\overline{1}_{PA_D} - \overline{1}_{PA_i})]$$

$$= PF_2''\left[\frac{(\overline{1}_{PA_i} \times \overline{U} \times \overline{1}_{PA_i})}{RW_{IE} \sin L}\right] = PF_2[\overline{U}]$$

which establishes the second form of Equation 2. In component form, $$\overline{W}_{JI} = PF_2''\left[-\overline{\delta}\frac{U_{North}}{RW_{IE}} + \overline{1}_E \frac{U_{East}}{RW_{IE} \sin L}\right]$$

$$= -\overline{\delta}PF_2'''\left[\frac{U_{North}}{R_y W_{IE}}\right] + \left(\frac{1}{\sin L}\right)^m \overline{1}_E PF_2''''\left[\frac{U_{East}}{R_x W_{IE}}\right]$$

At this point, we set $$PF_2''' = PF_2'''' = cW_{IE}PF_1$$

where $PF_1$ is defined above, and $c$ is a constant related to the constant $K_E$ used in the computer of FIG. 6.

$$c = \frac{K_E}{1 - \frac{T_g}{T_d}}$$

With this choice, the above expression becomes $$\overline{W}_{JI} = -\overline{\delta}cPF_1\left[\frac{U_{North}}{R_y}\right] + \overline{1}_E\left(\frac{1}{\sin L}\right)^m cPF_1\left[\frac{U_{East}}{R_x}\right]$$

where $m = -1$ for "diminished" torquing
$m = 0$ for "uniform" torquing
$m = 1$ for "augmented" torquing The same input signals used to damp the vertical can be used to erect the polar axis, needing only to be multiplied by a constant gain, or a constant times $(1/\sin L)^m$.

Figure 7:
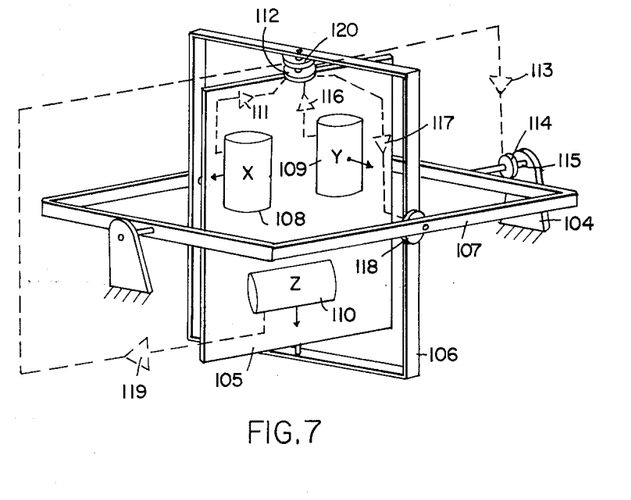
FIG. 7 is a perspective view of a 3 gimbal platform used in an embodiment of the navigation system of the present invention.

Referring now to FIG. 7, there is here shown a schematic perspective view of a three gimbal platform which may be used to mount the inertial sensors in a second configuration embodiment of the present invention. This figure illustrates the vehicle frame 104, inner gimbal 105, middle gimbal 106, and outer gimbal 107. The $x$, $y$ and $z$ gyros 108, 109 and 110 are mounted with their sensitive or input axes mutually orthogonal as indicated. Base-motion isolation is achieved for the inner gimbal using output signals from the gyros. The output of the $x$ gyro is applied to amplifier 111 and thence to resolver 112 which provides an output to amplifier 113. The signal from amplifier 113 is applied to gimbal drive 114 mounted on the outer gimbal axis 115. The output of the $y$-gyro is likewise applied to the resolver 112 through an amplifier 116. Resolver 112 in this case has an output which is applied to amplifier 117 and thence to gimbal drive 118 which rotates the middle gimbal. The $z$ gyro 110 provides an output to the $z$ amplifier 119 which is applied to the inner gimbal drive motor 120.

Gyro torquing signals (angular velocity commands) are sent from the computer to the gyros. These may be used to keep the platform axes $x$, $y$ and $z$ along the indicated directions east, north and up, respectively, for example. Three single degree of freedom accelerometers 136, 137 and 138 are mounted on the inner gimbal. These generate measurements of the $x$, $y$ and $z$ components, respectively, of the vector specific force, $\bar{f}$, related to the acceleration of the vehicle with respect to inertial space. The measurements are supplied to the computer, along with a set of components of the measured velocity of the vehicle with respect to the earth, from a Doppler radar set or some other sensor. The computer generates the gyro torquing signals needed for vertical tracking, and for damping the Schuler oscillations.

In the embodiment illustrated, a typical gimbal axis configuration employs, for example, the outer axis to isolate roll, the middle axis pitch, and the inner axis azimuth.

In this three-gimbal configuration, with the platform torqued to follow the local vertical, there is no explicit indication of the direction of the indicated polar axis. Rather, the I-frame which carries the indicated polar axis as one of its axes, is contained implicitly within the computer in terms of a set of numbers specifying the relative orientation of the I frame with respect to physical directions established by the axes of the platform. Polar-axis erection in this system configuration consists of modifying these numbers. The rules for modifying the numbers, i.e. the scalar equations to be mechanized, are obtained from the basic vector Equations 1 and 2, using standard and extensively described methods of mathematics, by decomposing the vectors into components along axes of suitably chosen reference frames.

Figure 8:
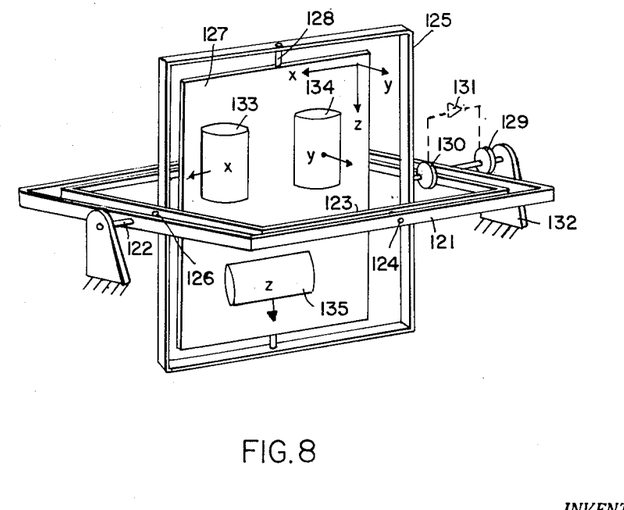
FIG. 8 is a perspective view of a 4 gimbal platform used in an embodiment of the navigation system of the present invention.

A third embodiment configuration of the navigation system of this invention will now be described. Referring now to FIG. 8 there is here shown a four-gimbal platform adapted for use in a navigation system of the present invention. In this embodiment, the outer gimbal is attached to the frame of the vehicle through the outer gimbal axis 122. The second gimbal 123 is attached through an axis 124. The third gimbal 125 is attached by means of an axis 126. The fourth gimbal 127 is attached by means of an axis 128. The inner three gimbals 123, 125 and 127 are interconnected physically, with drives, pickoffs, and amplifiers, in a manner similar to that shown in the three-gimbal platform illustrated in FIG. 7. Such connections are not shown. A typical gimbal axis order, from outermost to innermost, is: redundant pitch, roll, pitch, azimuth. In this arrangement, the interconnections among the three inner gimbals is like that shown in FIG. 7. In addition, the outer redundant gimbal axis drive 129 is powered by a signal pickoff 130 mounted on the third gimbal axis 126. The signal from the pickoff is then amplified by means of amplifier 131 and applied to the outer redundant axis drive 129.

Accelerometer outputs and gyro torque inputs for example, supply inertial measurements and data as in the three-gimbal platform illustrated in FIG. 7. The overall mounting is likewise attached to the vehicle frame 132 and the X, Y and Z axes are likewise determined by the X, Y and Z gyros 133, 134 and 135 and X, Y and Z accelerometers 139, 140 and 141.

Refer once again to FIGS. 1, 2 and 3, which apply to all embodiments including that of FIG. 8. The stable platform of FIG. 8, which is the innermost of the four-gimbals, is a part of inertial sensors 11 of FIG. 1. It is maintained nonrotating with respect to an indicated inertial frame I by platform-mounted gyros 20. A set of axes X, Y and Z fixed in the platform is a physical embodiment of the direction of the axes of the indicated inertial frame I, but since this reference frame may drift and may be caused to rotate to erect the indicated polar axis, it is not truly inertial. Platform-mounted accelerometers 15, which also form a part of inertial sensors 11, are used to measure the vector specific force. The stable platform is aligned nominally with the Z axis parallel to the earth's true polar axis, the X axis parallel to the intersection of the equatorial plane and the Greenwich meridian at zero Greenwich time, and the Y axis also parallel to the equatorial plane, so that X, Y and Z forms a right-handed system. In the absence of misalignment error, the X, Y and Z axes of the I-frame are parallel to the $X_T$, $Y_T$ and $Z_T$ axes of the true inertial frame J shown in FIG. 3. Computer 13 processes the accelerometer outputs to determine the indicated vehicle position, and the direction of the vertical. A secondary source of velocity such as velocity sensor 12, measures the vector velocity of the vehicle with respect to the earth. The orientation of the platform with respect to the body axes of some vehicle in which it may be contained, is obtained through measurement of the platform gimbal angles. The measured earth velocity vector is resolved in X, Y and Z components. The computer 13 solves the problem basically in geocentric coordinates: however, conversion to geographic coordinates or any other set of coordinates may also be obtained. The indicated position frame (i) contains as one axis the indicated position vector $\bar{R}$. This frame is rotated to reorient the indicated position vector according to any of the usual methods such as for example, free-azimuth, east-north-up, etc. The free azimuth method is illustrated here for convenience. In the free azimuth method, the z-axis defines the local vertical. The x and y axes take on variable positions relative to north and east, the exact relationship being retained in the computation. The east-north-up system keeps the I frame axes parallel to the directions of north, east, and up.

The difference or error between the inertially-indicated craft velocity with respect to the earth and that derived from the externally measured velocity is processed through a performance function $PF_1$ to obtain erection of the indicated vertical to the true vertical. The error is also processed through a performance function $PF_2$ to obtain erection of the indicated polar axis to the true polar axis. The equations to be solved by the computer are given below. These equations are scalar equivalents of the basic vector Equations 1 and 2, for a particular choice of PF and for three choices of $PF_2$, corresponding to what is termed "diminished," "uniform" or "augmented" torquing.

$$\dot{W}_{J_{I_X}} = \frac{1}{R}[f_Y\gamma_Z - f_Z\gamma_Y + G_{\perp X} - 2\dot{R}W_{J_{I_X}} + (PF_1)(Q_X)] - W_{J_{I_Z}}W_{J_{I_Y}}$$

$$\dot{W}_{J_{I_Y}} \frac{1}{R}[f_Z\gamma_X - f_X\gamma_Z + G_{\perp Y} - 2\dot{R}W_{J_{I_Y}} + (PF_1)(Q_Y)] + W_{J_{I_Z}}W_{J_{I_X}}$$

$$\dot{W}_{J_{I_Z}} = \frac{1}{R}[f_X\gamma_Y - f_Y\gamma_X + G_{\perp Z} - 2\dot{R}W_{J_{I_Z}} + (PF_1)(Q_Z)] + W_{J_{I_X}}W_{J_{I_Y}} - W_{J_{I_Y}}W_{J_{I_X}}$$

$$W_{J_{I_X}} = \int_0^t \dot{W}_{J_{I_X}} dt + W_{J_{I_X}}(o)$$

$$W_{J_{I_Y}} = \int_0^t \dot{W}_{J_{I_Y}} dt + W_{J_{I_Y}}(o)$$

$$W_{J_{I_Z}} = \int_0^t \dot{W}_{J_{I_Z}} dt + W_{J_{I_Z}}(o)$$

$$W_X = W_{J_{I_X}} - W_{J_{I_X}}$$

$$W_Y = W_{J_{I_Y}} = W_{J_{I_Y}}$$

$$W_Z = W_{J_{I_Z}}$$

$$\dot{\gamma}_X = W_Y\gamma_Z - W_Z\gamma_Y$$

$$\dot{\gamma}_Y = W_Z\gamma_X - W_X\gamma_Z$$

$$\dot{\gamma}_Z = W_X\gamma_Y - W_Y\gamma_X$$

$$\gamma_X = \gamma_X(0) + \int_0^t \dot{\gamma}_X dt$$

$$\gamma_Y = \gamma_Y(0) + \int_0^t \dot{\gamma}_Y dt$$

$$\gamma_Z = \gamma_Z(0) + \int_0^t \dot{\gamma}_Z dt$$

$$R = R_E + F(L_C) + h$$

$$\dot{R} = \frac{df}{dL_C}\dot{L} + \dot{h}$$

$$Q_x = \gamma_Y V_{MZ} - \gamma_Z V_{MY} - RW_{J_{I_X}} - W_{IE} R\gamma_X\gamma_Z$$

$$Q_Y = \gamma_Z V_{MX} - \gamma_X V_{MZ} - RW_{J_{I_Y}} - W_{IE} R\gamma_Y\gamma_Z$$

$$Q_Z = \gamma_X V_{MY} - \gamma_Y V_{MX} - RW_{J_{I_Z}} + W_{IE} R(1 - \gamma_Z^2)$$

$$W_{J_{I_X}} = \frac{b}{RW_{IE}}Q_Y \text{ or } \frac{b(-\gamma_Y Q_Z - \gamma_X\gamma_Y Q_X + \gamma_X^2 Q_Y)}{RW_{IE}(1-\gamma_Z^2)}$$

$$\text{or } \frac{b(-\gamma_Y Q_Z/\gamma_Z - \gamma_X\gamma_Y Q_X + \gamma_X^2 Q_Y)}{RW_{IE}(1-\gamma_Z^2)}$$

$$W_{J_{I_Y}} = \frac{-b}{RW_{IE}}Q_X \text{ or } \frac{b(\gamma_X Q_Z + \gamma_X\gamma_Y Q_Y - \gamma_X^2 Q_X)}{RW_{IE}(1-\gamma_Z^2)}$$

"Diminished" Torquing Commands    "Uniform" Torquing Commands $$\text{or } \frac{b(\gamma_X Q_Z/\gamma_Z + \gamma_X\gamma_Y Q_Y - \gamma_Y^2 Q_X)}{RW_{IE}(1-\gamma_S^2)}$$

"Augmented" Torquing Commands $W_{J_{I_Z}} = 0$ in all three methods of torquing $$\ddot{R}_v = -f_X\gamma_X - f_Y\gamma_Y - f_Z\gamma_Z + (\bar{\gamma}\cdot\bar{G}) + d(\gamma_X V_{MX} + \gamma_Y V_{MY} + \gamma_Z V_{MZ}\dot{R}_v) + R_v(W_{J_{I_X}}^2 + W_{J_{I_Y}}^2 + W_{J_{I_Z}}^2)$$

$$\dot{R}_v = -\ddot{R}_{vo} + \int_0^t \ddot{R}_v dt$$

$$R_v = R_{vo} + \int_0^t \dot{R}_v dt$$

where $(\bar{\gamma}.\bar{G})$ = component of G parallel to $\gamma$, a programmed function of $R_v$ and L.

$\bar{Q} = \bar{\gamma} \times \bar{U}$ = signal proportional to measured angular velocity error. $G_{\perp x}$, $G_{\perp y}$, $G_{\perp z}$ = the $x$, $y$, $z$ components of the component of $\bar{G}$ normal to $\bar{\gamma}$, i.e. $(\bar{\gamma} \times \bar{G})_x$, etc. obtained from a knowledge of the gravitational field of the earth (including anomalies, if desired).

$\bar{\gamma}$ = a unit (up) vector along $\bar{R}$; the indicated unit geocentric (up) vertical $R_E$ = average radius of the earth A symbol without a vector bar is the magnitude of the corresponding vector.

Any symbol without a vector bar, and with a subscript X, Y, Z is the corresponding component of the vector A dot over a symbol denotes a time derivative.

Zero indicates the initial value of a quantity.

h = altitude $\bar{W}_{AB}$ = angular velocity of B-frame with respect to A-frame, where A and B may be any specified frame.

$L = \sin^{-1} \gamma_z$ = indicated geocentric latitude $L = L + F(L)$ = indicated geographic latitude $f(L)$ = correction based on Hayford ellipsoid or other model assumed for shape of earth.

$l$ = indicated geographic longitude = $\tan^{-1}(\gamma_Y/\gamma_X) - W_{IE}t$.

$i$ = an indicated position frame; contains the indicated position vector along a fixed axis of this frame.

I = the reference frame established by the platform. (This is an inertially non-rotating frame in the absence of gyro drift and angular velocity commands). Axes are X, Y and Z.

J = an inertial reference frame against which the platform frame may be rotated by torquing the gyros, that is, the true inertial frame.

$W_{JI_X}$, $W_{JI_Y}$ = gyro torque commands for polar-axis erection.

$PF_1$ = constant for simple case "viscous damping" of vertical d = constant for the altitude channel $R_v$ = Value of R determined from inertial altitude channel.

b = constant, part of $PF_2$. The three equations for $R_v$ and its first and second time derivatives above permit determination of altitude by the damped inertial navigation system. This constitutes the altitude channel referred to above.

The outputs available from inertial sensor 11 and computer 13 include position (latitude, longitude, and altitude), velocity (three components), acceleration (three components), vehicle attitude, and the directions of the vertical, the earth's polar axis, north, east, etc.

All necessary information for an inertial altitude channel is present. Damping of errors in such a channel requires the addition of externally measured altitude or altitude rate. The latter is obtainable from the velocity measurements already mentioned. The equations for mechanizing this are shown in the set of equations given above.

This system can be carried in a vehicle at any speed, any altitude, anywhere on earth, or near any similar rotating, gravitational body of navigational interest. Complete maneuver freedom is enjoyed. Except for drift rate corrections and polar axis erection signals, the gyros need not be torqued, that is to say it would not be necessary to command an angular rate of the stable platform.

In the navigation system of the present invention it is not necessary to restrict the gyros to single-degree-of-freedom instruments. Two degree-of-freedom instruments are equally useful. In fact, there is no need to limit use to gyros as such. Any instrument capable of providing information for the measurement and control of angular orientation in space, is equally useful.

Similarly, there is no need to restrict the accelerometers to single-degree-of-freedom instruments. Two or three degree-of-freedom units may be used. Also the accelerometers can be replaced by any other device measures the vector specific force acting on the vehicle or platform, or otherwise measures its translatory motion by inertial means. Furthermore, it is not necessary to mount the inertial sensors, whatever they are, on a gimballed platform. They may be directly mounted on the body of the vehicle, with the computer carrying out the necessary resolutions.

The velocity sensor can be replaced by a sensor which determines position with respect to the earth, rather than velocity. Such sensors include Loran, Shoran, Decca, optical sighting of check points, etc. Some modification of the data is necessary in this case, but the same principles apply. The essential quality is that the determination of navigational data is made with respect to the earth by one sensor, and with respect to inertial space by the other sensor.

Any type of computer of sufficient accuracy can be used. Commonly available types of digital and analog computers are described extensively in the literature. It is not necessary to use a computer which operates on scalar components. A three-dimensional vector computer (if such is available) can be used so long as it is capable of solving the basic vector equations given above.

There is also a great deal of flexibility in the choice of the performance functions $PF_1$ and $PF_2$ because they operate on signals which would be zero in the absence of system errors. Their outputs may be continuous or discrete. They may represent different operators for each of the three different components of the operand. They may be made zero for any arbitrary length to time. Polar-axis erection and vertical erection cease while they are zero, but this may be perfectly acceptable in particular applications, especially if there are periods of time in which it is not possible to measure the velocity $\bar{V}_M$ with the velocity sensor.

There is also no need to restrict the choice of vertical used in the system to any one particular form. Any suitably defined vertical may be used, such as the geocentric vertical, the geographic vertical, the normal to the geoid, etc. Similarly, any suitably defined coordinates can be used to define the position, velocity, etc. of the craft. Thus, geocentric latitude, geographic latitude, etc. may be used. Furthermore, by rescaling variables as appropriate, the system may be used for navigation in the neighborhood of any body of interest in the universe, provided that body has a gravitational field, and rotates about an axis.

The navigation system of the present invention provides a significant step forward in the art of navigation by providing a system that is dynamically exact, that is, there are no forced dynamic errors resulting from either the mechanization of the system, if it is a sufficiently accurate mechanization of the basic vector equations, or from motional inputs of any kind from the vehicle itself.

While there have been described three different embodiments of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. A navigation system for a vehicle comprising,
    first transducing means responsive to the acceleration of said vehicle for providing a first signal representative of the movement of said vehicle through space, second transducing means responsive to relative velocity between said vehicle and earth for providing a second signal representative of the velocity-derived vector velocity of said vehicle with respect to earth, means responsive to said first signal for providing a third signal related to the inertial-derived vector velocity of said vehicle with respect to earth, a source of a fourth signal representative of the angular velocity vector of earth about its polar axis, means for combining said second, third and fourth signals to derive an error signal representative of the vector difference between said velocity-derived vector velocity and said inertial-derived vector velocity, means for establishing first and second components of said error signal representative of respective first and second orthogonal components of said vector difference, means for establishing a fifth signal representative of the orientation of the earth polar axis which fifth signal representation may differ from the true orientation of said polar axis by a vector deviation representable by first and second orthogonal deviation components respectively perpendicular to the meridional plane of the earth including said vehicle and perpendicular to the polar axis and in said meridional plane, and means for applying said first and second components of said error signal to the latter means for establishing to reduce respective ones of said first and second orthogonal deviation components, said means for establishing said fifth signal comprising, a latitude gyro whose input axis is normally parallel to the east-west line of direction through said vehicle, an equatorial gyro whose input axis is normally perpendicular to said polar axis and said east-west line of direction, means responsive to said first component of said error signal for maintaining the input axis of said latitude gyro substantially parallel to said east-west line of direction, and means responsive to said second component of said error signal for maintaining the input axis of said equatorial gyro substantially perpendicular to said polar axis and said east-west line of direction.

2. A navigation system for a vehicle comprising, first transducing means responsive to the acceleration of said vehicle for providing a first signal representative of the movement of said vehicle through space, second transducing means responsive to relative velocity between said vehicle and a rotating body moving in space for providing a second signal representative of the velocity-derived vector velocity of said vehicle with respect to said body, means responsive to said first signal for providing a third signal related to the inertial-derived vector velocity of said vehicle with respect to said body, a source of a fourth signal representative of the angular velocity vector of said rotating body about its axis, means for combining said second, third and fourth signals to derive an error signal representative of the vector difference between said velocity-derived vector velocity and said inertial-derived vector velocity, means for establishing first and second components of said error signal representative of respective first and second orthogonal components of said vector difference, means for establishing a fifth signal representative of the orientation of the axis about which said body rotates which fifth signal representation may differ from the true orientation of said axis by a vector deviation representable by first and second orthogonal deviation components, means for applying said first and second components of said error signal to the latter means for establishing to reduce respective ones of said first and second orthogonal deviation components, means for establishing a sixth signal representative of the line of direction through the center of said rotating body and vehicle which representation may differ from the true orientation of said line of direction by a vector deviation representable by third and fourth orthogonal deviation components, and means for applying said first and second components of said signal to the latter means for establishing to reduce respective ones of said third and fourth orthogonal deviation components, said rotating body being the earth, said rotating body axis being the polar axis of the earth, said first deviation component being perpendicular to the meridional plane of the earth including said vehicle, said second deviation component being perpendicular to the polar axis in said meridional plane, said means for establishing said fifth signal comprising, a latitude gyro whose input axis is normally parallel to the east-west line of direction through said vehicle, an equatorial gyro whose input axis is normally perpendicular to said polar axis and said east-west line of direction, means responsive to said first component of said error signal for maintaining the input axis of said latitude gyro substantially parallel to said east-west line of direction, and means responsive to said second component of said error signal for maintaining the input axis of said equatorial gyro substantially perpendicular to said polar axis and said east-west line of direction.

References Cited by the Examiner

UNITED STATES PATENTS

| | | | |
|---|---|---|---|
| 2,752,793 | 7/1956 | Draper et al. | |
| 2,902,772 | 9/1959 | Ciscel | 33—226 |
| 2,936,627 | 5/1960 | Wing et al. | 74—5.34 |
| 2,946,539 | 7/1960 | Fischel | 73—178 X |
| 2,953,926 | 9/1960 | Wrigley et al. | 74—5.37 |
| 2,996,268 | 8/1961 | Brown et al. | 33—204 X |
| 3,023,617 | 3/1962 | Statsinger | 73—178 |

ROBERT B. HULL, *Primary Examiner.*

LOUIS R. PRINCE, *Examiner.*